March 21, 1939.  C. E. THOMAS  2,151,246
FORMING MACHINE
Filed April 20, 1936  2 Sheets-Sheet 1
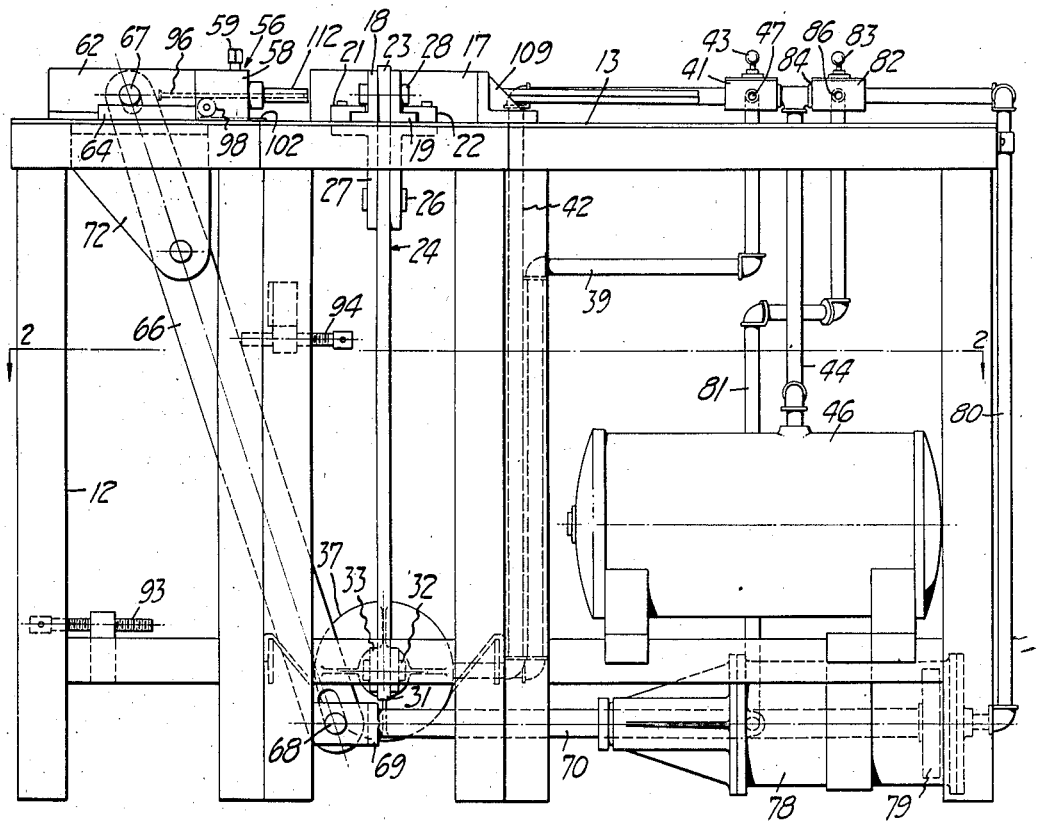
FIG_1_
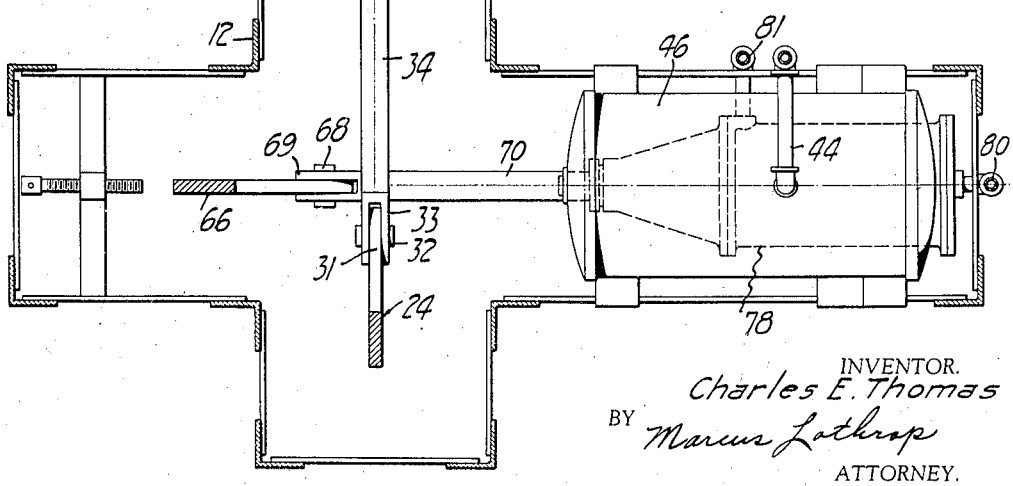
FIG_2_
INVENTOR.
Charles E. Thomas
BY Marcus Lothrop
ATTORNEY.

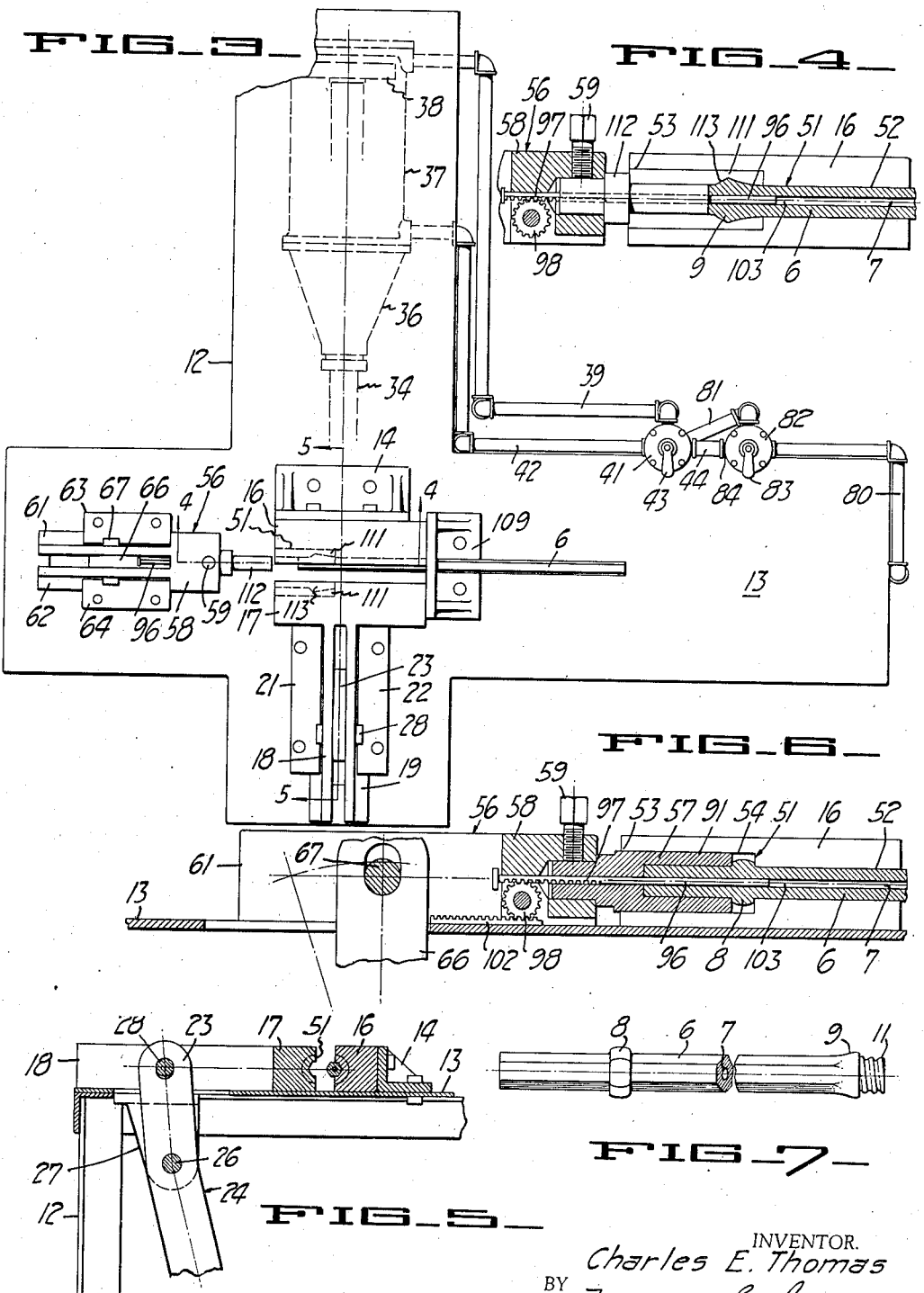

Patented Mar. 21, 1939

2,151,246

UNITED STATES PATENT OFFICE 2,151,246

FORMING MACHINE

Charles E. Thomas, Grass Valley, Calif.

Application April 20, 1936, Serial No. 75,320

2 Claims. (Cl. 76—5)

My invention relates to means for forming metals, and is especially concerned with a mechanism for shaping and contouring rock drills. Rock drills are customarily made of straight stock, hexagonal in cross-section and having a central bore extending from end to end. The drill bit is usually a separate piece screwed onto one end of the shank which is preferably enlarged and threaded at one end for this purpose. Adjacent to but spaced from the other end, the shank is provided with an enlargement such as an abutment or a collar in order that it can be suitably positioned in the actuating tool. The central bore acts as a duct for fluid to assist in the drilling operation. The present practice in manufacturing a drill shank is either to fabricate it by hand forging or to machine forge it while it is hot, using heavy hammer blows. This operation not only consumes considerable time but sometimes results in a weakening of the drill shank in vulnerable spots.

It is therefore an object of my invention to provide a forming machine which will produce the necessary and desired enlargements on a drill shank without the use of hammer blows.

Another object of my invention is to provide a machine for providing different types of enlargements on a drill shank without materially altering the machine.

A further object of my invention is to provide means for effecting the necessary forming operations on drill material in a very short time.

An additional object of my invention is to provide means for forming standard drill stock without injuring or affecting the central bore.

A still further object of my invention is to provide a forming machine which is effective upon the stock but is incapable of exerting excessive forces.

The foregoing and other objects are attained in the embodiments of the invention illustrated in the drawings, in which—

Fig. 1 is a side elevation of a forming machine constructed in accordance with my invention.

Fig. 2 is a cross-section the plane of which is indicated by the line 2—2 of Fig. 1, a portion of the machine being broken away to reduce the size of the figure.

Fig. 3 is a plan of the machine shown in Figs. 1 and 2.

Fig. 4 is a cross-section the plane of which is indicated by the line 4—4 of Fig. 3.

Fig. 5 is a detailed cross-section the plane of which is indicated by the line 5—5 of Fig. 3.

Fig. 6 is a view similar to Fig. 4 but showing a different die and plunger attachment.

Fig. 7 is a side elevation of a drill shank produced by my forming machine, a portion being broken away to reduce the size of the figure.

In its preferred form, the forming machine of my invention includes a pair of approachable dies which in abutted position define an elongated, centrally enlarged cavity within which drill stocks can be located, together with a reciprocable plunger movable into the cavity from one end in order to engage and enlarge or displace the drill stock.

While the forming machine of my invention is susceptible of many different embodiments and can be modified in detail for different specific uses, it is especially applicable for the production of drill shanks as disclosed in Fig. 7. These are preferably constructed of drill stock which is usually a straight steel bar 6, hexagonal in cross-section, with a central bore 7 therein. The finished shank has an enlarged collar 8 spaced a fixed distance from one end, and an enlargement 9 adjacent the other end in order to allow for a threaded portion 11 onto which the drill bit is screwed.

The forming machine of my invention not only upsets the drill stock to provide the collar 8 but likewise upsets the drill stock to provide the enlargement 9 on which the threads are cut. The machine incorporates a frame 12, which is suitably fabricated of angle iron and strap iron in any convenient manner, in the present case the machine in plan having an X-shaped contour. The framework includes a generally planar table 13 to which a bracket 14 is fastened. Removably secured to the bracket is one member 16 of a pair of dies, the other member 17 of which is mounted for relative movement with respect to the die 16. The movement of the die 17 is preferably confined to rectilinear translation and consequently the die is extended to provide a pair of rails 18 and 19 spaced apart and individually mating with guides 21 and 22, respectively, secured to the table 13.

Interposed between the rails 18 and 19 is the upper end 23 of a lever, generally designated 24, which is fulcrumed on a pin 26 passing through brackets 27 depending from the table 13. A pin 28 operates in a vertical slot in the rails 18 and 19, while the lower end 31 of the lever is slotted to receive a pin 32 fast in the clevice end 33 of a piston rod 34. The rod 34 extends through a suitable packing gland 36 into the interior of a pneumatic cylinder 37 mounted on the frame, within which is a double acting piston 38. A conduit 39 extends from one end of the cylinder 37 to a control valve 41, while a conduit 42 extends from the other end of the cylinder to the control valve. The valve 41 is operated by a handle 43 and is effective to connect either the conduit 39 or the conduit 42 to a pipe 44 leading to a source or reservoir 46 of air under pressure from any suitable source or, alternatively, to connect either of the conduits to the atmosphere through a vent port 47. The operator, by suitably manipulating the handle 43, can therefore displace the piston 38 in either direction with a resilient force. Such displacement of the piston consequently moves the piston rod 34, the lever 24, and moves the die 17 in a translatory motion.

The dies 16 and 17 are used to grip the drill stock for the forming operation, and consequently the two dies, when in approached position, together form a cavity, generally designated 51, which is open at one end 52 and at the other end 53, and which between its ends, as at 54 for example, is enlarged. The size of the cavity between the end 52 and the enlarged portion 51, when the dies are in abutted or approached position, is such that a piece of drill stock introduced therebetween is tightly gripped. A projecting portion of the stock lies within the enlarged part 54 of the cavity, the projecting portion having been heated, not uniformly but preferably more intensely in the portion adjacent the center of the cavity.

In accordance with my invention I provide means for treating the gripped and heated drill stock. To this end I mount on the table 13 a plunger 56 which includes a dolly 57 (Fig. 6) removably received in a plunger socket 58 and held by a set screw 59. The plunger is extended to form a pair of rails 61 and 62, confined to rectilinear translation on the table 13 by a pair of guides 63 and 64, respectively. Between the guides is located a lever 66, connected to the guides by a pin 67 operating in a slot. The lever is fulcrumed in a pair of brackets 72 secured to the table 13. The lower end of the lever 66 is connected by a loosely fitting pin 68 to the end 69 of a piston rod 70 extending to a cylinder 78 identical with the cylinder 37 and having a corresponding piston 79 therein. Opposite ends of the cylinder 78 are connected by conduits 80 and 81 to a control valve 82 having an operating handle 83 and provided with a connection 84 to the supply conduit 44 and a port 86 opening to the atmosphere. By suitably manipulating the handle 83 the operator can utilize air pressure from the reservoir 46 to move the lever 66 and hence translate the plunger 56.

For the operation of providing the collar 8 on the drill stock, I preferably make the dolly 57 with an exterior circular-cylindrical contour 91 which fits easily within the corresponding circular cylindrical contour of the cavity 54. Interiorly the dolly is provided with a cylindrical contour, hexagonal in cross-section, to mate with the tool stock. The axial length of the interior of the dolly is equivalent to the desired length of untreated portion of the drill stock, and consequently, when the plunger 58 is translated at a right angle to the path of movement of the movable die 17 and enters into the enlarged cavity 54, it is somewhat guided thereby and slips over the projecting end of the drill stock. As soon as the drill stock has bottomed in the dolly and the dolly continues its inward movement, the heated portion of the stock is upset or expanded and occupies or flows into the space remaining between the advancing face of the dolly and the annular face of the two dies where the interior diameter abruptly increases. The material of the drill stock is therefore upset or expanded to provide a collar such as is shown in Fig. 7.

As soon as the plunger has entered sufficiently far into the cavity 54 to provide the requisite size collar, the plunger is stopped by abutment of the lever 66 against an adjustable stop 93 mounted on the frame 12. The operating handle 83 is then reversed and the plunger 56 is withdrawn until the lever 66 abuts an adjustable stop 94 for governing the amount of material to be upset. The operating handle 43 is reversed and the dies 16 and 17 are spread apart so that the drill shank can be removed therefrom. This operation provides a well finished end on the drill shank, but preferably the operation is refined somewhat by the action of a pin 96 which is translatable within the plunger 56 and extends through the hollow interior of the dolly 57. The pin 96 is provided with teeth 97 to mesh with a gear 98 mounted on a pivot pin 99 on the slotted plunger 56. The gear 98 meshes with the teeth of a rack 102 fastened on the table 13. When the plunger 56 is advanced to enter the cavity 54 between the dies, the gear 98 meshing with the rack 102 is rotated and advances the pin 96 at a faster rate, so that the pin enters into the central bore 103 of the drill stock far enough to pass the portion to be upset. Thus, when the plunger is displacing material to form the collar 8, the diameter of the interior bore 103 is not diminished or affected.

After the upsetting operation is finished, the pin 96 is withdrawn at a faster rate than the plunger, and when the plunger is entirely withdrawn the pin is in inactive position. Furthermore, the operation is steadied by a bracket 109 apertured to pass the drill stock and fastened to the table 13 in order that, when the dies 16 and 17 are in closed position with the drill stock clamped therebetween, a firm structure is provided to resist the forces attendant upon the entry of the plunger 56 ino the cavity 54.

When the collar 8 has been formed as described and the jaws 16 and 17 have been separated, the drill stock is turned end for end so that a heated terminus is located within the cavity 54. Prior to this operation the cavity 54 is equipped with a pair of removable die liners 111 of the general contour shown in Fig. 4 and which are of an appropriate size, when abutted, just to receive a replacement plunger 112 which is introduced into the plunger 56 in place of the dolly. After the dies 16 and 17 have been abutted with this new relationship of parts, the plunger 56 is advanced into active position, and the plunger dolly 112 enters into the interior space and abuts the heated end of the drill stock. Further plunger movement is sufficient to upset and displace the material of the drill stock, virtually completely to fill the cavity 113 defined by the die liners 111, and an enlarged terminus is left on the drill stock. The pin 96 operates as before. When the requisite displacement of metal has been effected, the plunger is withdrawn by suitable operation of the pneumatic mechanism, the dies 16 and 17 are separated, and the properly formed die stock is removed, so that there is completed a drill shank of the character shown in Fig. 7.

I claim:

1. A forming machine comprising a frame, a pair of dies on said frame together defining a cavity, means for separating said dies, a plunger movable into said cavity, means for moving said plunger into said cavity, a rod within said plunger, and gearing connected to said rod, said plunger and said frame for moving said rod at a greater rate than said plunger.

2. A forming machine comprising a frame, means on said frame defining a cavity, a plunger, means for moving said plunger into and out of said cavity, a rod within said plunger, a gear rotatably mounted on said plunger, a rack on said rod meshing with said gear, and a rack on said frame meshing with said gear whereby said rod is moved at a greater rate than said plunger.

CHARLES E. THOMAS.